United States Patent
Itoh et al.

(10) Patent No.: US 11,287,395 B2
(45) Date of Patent: Mar. 29, 2022

(54) CAPACITIVE GAS SENSOR

(71) Applicants: Hokuriku Electric Industry Co., Ltd., Toyama (JP); SHINSHU UNIVERSITY, Matsumoto (JP)

(72) Inventors: Eiji Itoh, Matsumoto (JP); Yoshinori Yamaguchi, Toyama (JP); Tatsuya Nishida, Toyama (JP); Kousuke Matsubara, Toyama (JP)

(73) Assignees: HOKURIKU ELECTRIC INDUSTRY CO., LTD., Toyama (JP); SHINSHU UNIVERSTIY, Matsumoto (JP)

( * ) Notice: Subject to any disclaimer, the term of this patent is extended or adjusted under 35 U.S.C. 154(b) by 62 days.

(21) Appl. No.: 16/331,701

(22) PCT Filed: Sep. 8, 2017

(86) PCT No.: PCT/JP2017/032422
§ 371 (c)(1),
(2) Date: Mar. 8, 2019

(87) PCT Pub. No.: WO2018/047936
PCT Pub. Date: Mar. 15, 2018

(65) Prior Publication Data
US 2019/0250117 A1      Aug. 15, 2019

(30) Foreign Application Priority Data

Sep. 9, 2016 (JP) .............................. JP2016-176199

(51) Int. Cl.
*G01N 27/22* (2006.01)

(52) U.S. Cl.
CPC .......... *G01N 27/226* (2013.01); *G01N 27/22* (2013.01); *G01N 27/223* (2013.01); *G01N 2027/222* (2013.01)

(58) Field of Classification Search
None
See application file for complete search history.

(56) References Cited

U.S. PATENT DOCUMENTS

| 4,603,372 A | * | 7/1986 | Abadie | ................ G01N 27/225 257/467 |
| 5,296,819 A | | 3/1994 | Kuroiwa et al. | |

(Continued)

FOREIGN PATENT DOCUMENTS

| JP | 05-099877 | 4/1993 |
| JP | 2013-539040 | 10/2013 |

(Continued)

OTHER PUBLICATIONS

Eiji Itoh and Akinori Takada, "Fabrication of fast, highly sensitive all-printed capacitive humidity sensors with carbon nanotube/polyimide hybrid electrodes", Published Jan. 19, 2016, 2016 The Japan Society of Applied Physics, Japanese Journal of Applied Physics, vol. 55, No., Listed in International Search Report, English test, 3 pages.

(Continued)

*Primary Examiner* — Nasima Monsur
(74) *Attorney, Agent, or Firm* — Rankin, Hill & Clark LLP

(57) ABSTRACT

A capacitive gas sensor in which a second electrode layer made of a nano-carbon material entangled to be three-dimensionally reticulated and a gas-sensitive film are not separated from each other. A capacitive gas sensor includes a substrate; a first electrode layer formed on the substrate; a gas-sensitive film formed on the first electrode layer and having air permeability; and a second electrode layer formed on the gas-sensitive film to be opposed to the first electrode layer and made of a nano-carbon material entangled to be three-dimensionally reticulated. The capacitive gas sensor also includes a reinforcing resin layer having air permeability and disposed at least on the second electrode layer.

9 Claims, 3 Drawing Sheets

(56) References Cited

U.S. PATENT DOCUMENTS

| | | | | |
|---|---|---|---|---|
| 2004/0008471 | A1* | 1/2004 | Davis | G01N 27/225 |
| | | | | 361/306.3 |
| 2006/0249402 | A1 | 11/2006 | Snow et al. | |
| 2015/0153297 | A1* | 6/2015 | Aliane | G01N 27/223 |
| | | | | 73/335.04 |
| 2015/0355124 | A1* | 12/2015 | Yazawa | G01N 27/223 |
| | | | | 73/335.04 |

FOREIGN PATENT DOCUMENTS

| | | |
|---|---|---|
| JP | 2015-007618 | 1/2015 |
| JP | 2015-518158 | 6/2015 |
| JP | 2015-525362 | 9/2015 |
| JP | 2016-504595 | 2/2016 |
| WO | 2012/044419 | 4/2012 |
| WO | 2013/182542 | 12/2013 |
| WO | 2014/003979 | 1/2014 |
| WO | 2014/108371 | 7/2014 |

OTHER PUBLICATIONS

International Search Report, dated Nov. 28, 2017 (Nov. 28, 2017), 2 pages.

* cited by examiner

CAPACITIVE GAS SENSOR

TECHNICAL FIELD

The present invention relates to a capacitive gas sensor to be used to measure a humidity etc.

BACKGROUND ART

JP 2015-7618 A discloses a capacitive gas sensor including: a substrate; a first electrode layer formed on the substrate; a gas-sensitive film formed on the first electrode layer and having air permeability; and a second electrode layer formed on the gas-sensitive film to be opposed to the first electrode layer and made of a nano-carbon material entangled to be three-dimensionally reticulated.

RELATED-ART DOCUMENT

Patent Document

Patent Document 1: JP 2015-7618 A

SUMMARY OF INVENTION

Technical Problem

If the second electrode layer provided on the outer surface of the gas-sensitive film is formed from a nano-carbon material, the second electrode layer has improved gas permeability, since the second electrode layer has a structure in which the nano-carbon material is entangled to be three-dimensionally reticulated. With the structure in which the nano-carbon material is entangled to be three-dimensionally reticulated, however, the electrode layer and the gas-sensitive film contact each other over a reduced area. Therefore, the first electrode layer and the second electrode layer may be separated from each other when the bonding strength between the second electrode layer and the gas-sensitive film is lowered due to increased ambient humidity or a change over time. As a result, the electrical resistance may be increased, which may make the capacitive gas sensor unable to perform a measurement when the frequency of an applied AC signal is significantly high. In addition, occurrence of such separation may cause degradation in linear response of the capacitance to the humidity, or cause hysteresis.

An object of the present invention is to provide a capacitive gas sensor in which a second electrode layer made of a nano-carbon material entangled to be three-dimensionally reticulated and a gas-sensitive film are not separated from each other.

Solution to Problem

The present invention is directed to a capacitive gas sensor including: a substrate; a first electrode layer formed on the substrate; a gas-sensitive film formed on the first electrode layer and having air permeability; and a second electrode layer formed on the gas-sensitive film to be opposed to the first electrode layer and made of a nano-carbon material entangled to be three-dimensionally reticulated. In the capacitive gas sensor according to the present invention, the second electrode layer is sized such that a part of the gas-sensitive film extends out around the second electrode layer. The capacitive gas sensor also includes a reinforcing resin layer having air permeability and made of a same material as the gas-sensitive film. The reinforcing resin layer is disposed at least on the second electrode layer. The reinforcing resin layer gets into voids inside the second electrode layer and a part of the reinforcing resin layer contacts the gas-sensitive film.

With such a structure, the reinforcing resin layer gets into voids inside the second electrode layer which is made of a nano-carbon material entangled to be three-dimensionally reticulated, and a part of the reinforcing resin layer contacts the gas-sensitive film. Consequently, the reinforcing resin layer plays a function of preventing separation of the second electrode layer from the gas-sensitive film. With such a structure, the reinforcing resin layer is partially bonded to a part of the gas-sensitive film, thereby preventing separation of the second electrode layer from the gas-sensitive film when the frequency of an AC signal applied between the first electrode layer and the second electrode layer is significantly high or the ambient humidity is high. As a result, degradation in sensor detection accuracy can be prevented even if the second electrode layer is formed from a nano-carbon material entangled to be three-dimensionally reticulated. According to the present invention, the separation can be prevented, thereby preventing degradation in linear response of the capacitance to the humidity and occurrence of hysteresis.

The reinforcing resin layer may be present only on the second electrode layer.

The second electrode layer may be sized such that a part of the gas-sensitive film extends out around the second electrode layer; and the reinforcing resin layer having air permeability may cover the second electrode layer and at least a part of the gas-sensitive film that extends out of the second electrode layer. With such a structure, the reinforcing resin layer is directly bonded to a part of the gas-sensitive film, not via the second electrode layer, around the second electrode layer. Thus, separation of the second electrode layer from the gas-sensitive film can be prevented more reliably.

The reinforcing resin layer is preferably made of a same material as the gas-sensitive film. If the reinforcing resin layer is made of the same material as the gas-sensitive film, strong chemical bond can be obtained at the bonding surface between the reinforcing resin layer and the gas-sensitive film. The reinforcing resin layer serves as an anchor that prevents separation of the second electrode layer from the gas-sensitive film. Therefore, according to the present invention, separation of the second electrode layer from the gas-sensitive film can be prevented more reliably. If the reinforcing resin layer is 2 μm or less in thickness, the presence of the reinforcing resin layer does not significantly reduce the air permeability of the second electrode layer. Thus, it is possible to prevent a significant reduction in detection sensitivity due to the presence of the reinforcing resin layer. If the reinforcing resin layer is 1 μm or less in thickness, a quick response can be maintained.

The gas-sensitive film may vary in capacitance according to a change in humidity, for example. In that case, the gas-sensitive film is preferably made of fluorinated polyimide.

The nano-carbon material is preferably composed of one or more sorts selected from SWCNT, MWCNT, DWCNT, and graphene.

Specifically, at least one first electrode portion is formed on the substrate to connect to the first electrode layer and at least one second electrode portion is formed on the substrate to connect to the second electrode layer; and the gas-sensitive film is formed on the substrate to cover the first electrode layer and to expose the at least one first electrode portion and the at least one second electrode portion. In this configuration, the second electrode layer, the at least one second electrode portion, and the gas-sensitive film are preferably electrically connected to each other via an electrically conductive through-hole portion. Use of such a connection structure can reduce the dimensions of the capacitive gas sensor.

If a pair of electrode portions are formed on the substrate such that the pair of electrode portions are overlaid respectively on both ends of the second electrode layer for electrical connection, the reinforcing resin layer is preferably shaped and sized to cover the both ends of the second electrode layer and a part of the pair of electrode portions. This makes it possible to effectively prevent separation of the second electrode layer from the electrode portions.

In the capacitive gas sensor according to the present invention, a pair of sensor elements may be provided on the substrate. In such a capacitive gas sensor, two second electrode layers are formed at an interval on the gas-sensitive film to cross the first electrode layer. The two second electrode layers are sized in width such that a part of the gas-sensitive film extends out around the two second electrode layers. The reinforcing resin layer having air permeability covers the two second electrode layers and at least a part of the gas-sensitive film that extends out of the two second electrode layers. The reinforcing resin layer is made of a same material as the gas-sensitive film. The reinforcing resin layer gets into voids inside the second electrode layer and a part of the reinforcing resin layer contacts the gas-sensitive film. The pair of sensor elements are formed between the first electrode layer and the two second electrode layers. Consequently, the temperature characteristics can be improved utilizing outputs from the two sensor elements.

DESCRIPTION OF EMBODIMENTS

A humidity sensor that uses a gas-sensitive film (humidity-sensitive film), of which the dielectric constant varies according to the amount of adsorbed water, will be described as an example capacitive gas sensor according to an embodiment of the present invention.

Figure 1:
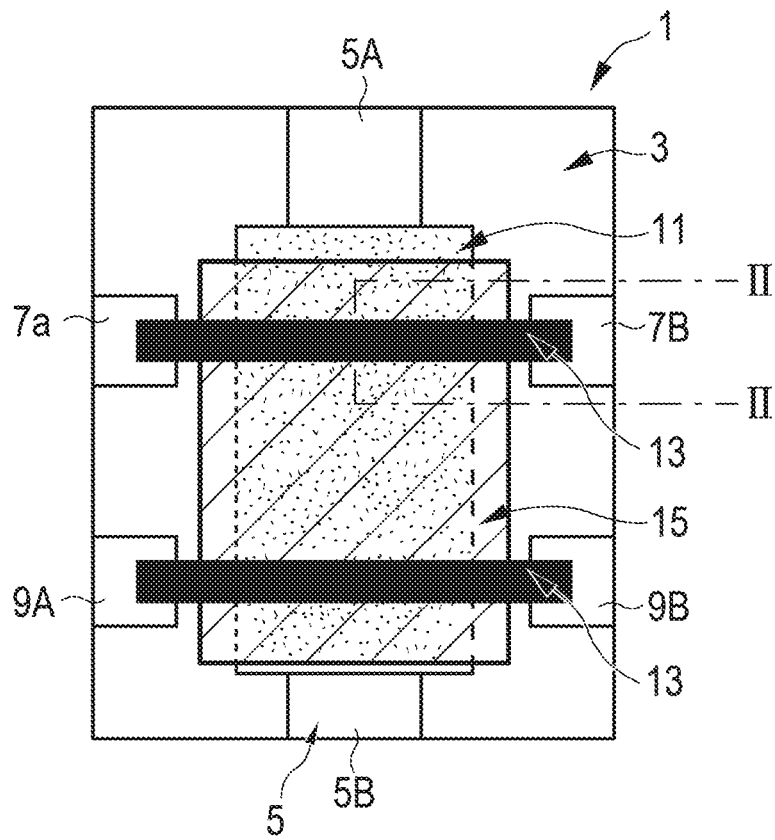
FIG. 1 is a plan view illustrating an example capacitive gas sensor fabricated as a humidity sensor according to a first embodiment of the present invention.
Figure 2:
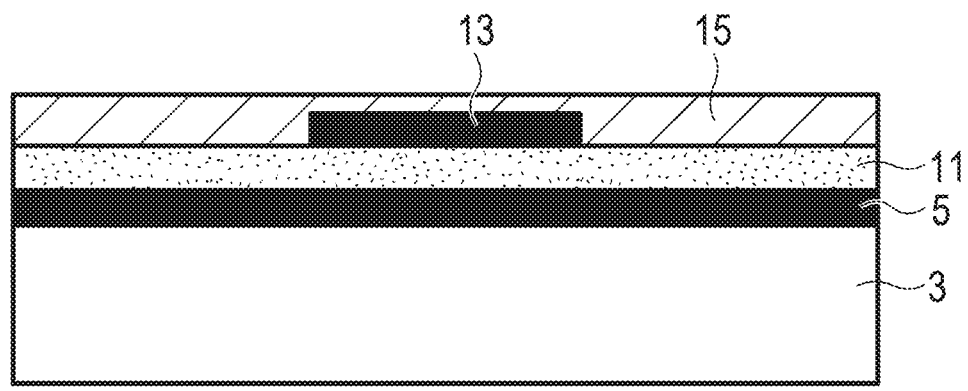
FIG. 2 is a sectional view as taken along line II-II in FIG. 1.

FIG. 1 is a plan view illustrating an example capacitive gas sensor 1 fabricated as a humidity sensor according to a first embodiment of the present invention. FIG. 2 is a sectional view as taken along line II-II in FIG. 1. FIG. 2 is illustrated schematically, and the thicknesses of the layers are not proportional to the actual dimensions. The capacitive gas sensor according to the present embodiment includes a substrate 3, a first electrode layer 5 provided on the substrate 3 and integrally including electrode portions 5A and 5B at both ends, and two pairs of electrode portions 7A and 7B and 9A and 9B. In the present embodiment, the substrate 3 may be a desired substrate, such as a silicon substrate or a resin substrate, on which an electrically conductive layer is formed by a desired film formation method, in place of a glass substrate with transparent electrodes.

The first electrode layer 5 and the pairs of electrode portions 7A and 7B and 9A and 9B are formed as transparent electrodes (ITO). On the substrate 3, a gas-sensitive film 11 having air permeability is formed on the first electrode layer 5 except for the electrode portions 5A and 5B. The gas-sensitive film 11 varies in capacitance according to a change in humidity. Specifically, the gas-sensitive film 11 is made of fluorinated polyimide.

The capacitive gas sensor also includes two second electrode layers 13, 13 formed on the gas-sensitive film 11 to be partially opposed to the first electrode layer 5 and made of a nano-carbon material entangled to be three-dimensionally reticulated. In this example, the two second electrode layers 13, 13 are formed at an interval on the gas-sensitive film 11 to cross the first electrode layer 5. The two second electrode layers 13, 13 are sized in width such that a part of the gas-sensitive film 11 extends out around the two second electrode layers 13, 13. The two second electrode layers 13, 13 are formed such that both ends thereof are overlaid respectively on the pairs of electrode portions 7A and 7B and 9A and 9B.

In the present embodiment, a reinforcing resin layer 15 having air permeability and having a thickness enough to infiltrate the two second electrode layers 13, 13 and contact the gas-sensitive film 11 covers the two second electrode layers 13, 13 and at least a part of the gas-sensitive film 11 that extends out of the two second electrode layers 13, 13. In the present embodiment, a pair of humidity sensor elements are formed between the first electrode layer 5 and the two second electrode layers 13, 13.

Example

An example capacitive gas sensor to be tested was configured as illustrated in FIGS. 1 and 2, and had the following materials and dimensions. The first electrode layer 5 was made of ITO, and had a width of 4 mm and a thickness of 150 nm. The pairs of electrode portions 7A and 7B and 9A and 9B were also made of ITO, and had dimensions of 4 mm by 4 mm.

A fluorinated polyimide film (thickness: 1.4 µm) was used as the gas-sensitive film 11. The fluorinated polyimide is polyimide containing fluorine. Specific examples of the fluorinated polyimide include polyimide containing a trifluoromethyl group or a hexafluoropropane group. The fluorinated polyimide has the hydrophilic properties of polyimide and the hydrophobic properties of fluorine, and thus can immediately absorb and release water according to the ambient humidity, advantageously providing good response characteristics. The sensitivity in humidity detection is improved as the gas-sensitive film 11 is thinner. It should be noted, however, that the film strength is reduced as the film is thinner, and thus an appropriate thickness is set according to the usage. The thickness of the gas-sensitive film 11 may be determined in the range of about 10 nm to 100 µm.

To form the gas-sensitive film 11, a precursor of the fluorinated polyimide is flatly applied onto the substrate 3 to form a precursor coating film made of the precursor of the fluorinated polyimide. The thicknesses of the gas-sensitive film 11 and the reinforcing resin layer 15 depend on the thickness of the precursor coating film, and thus the thickness of the precursor coating film is adjusted according to the thickness of the gas-sensitive film 11 to be formed. Then, the precursor coating film is pre-baked. The pre-baking temperature (100 to 200° C.) is set to a temperature at which a solvent of the precursor coating film is scattered and the precursor coating film is not imidized. Next, a portion of the precursor coating film that covers the electrode portions 7A to 9B is removed by plasma etching to expose the electrode portions 7A to 9B.

The reinforcing resin layer 15 was made of the same material as the gas-sensitive film 11. Therefore, a fluorinated polyimide film was used as the reinforcing resin layer 15. The reinforcing resin layer 15 preferably has a thickness enough to infiltrate the second electrode layers 13, 13 to contact the gas-sensitive film 11. Specifically, the reinforcing resin layer 15 is preferably 2 μm in thickness. More preferably, the reinforcing resin layer 15 is 1 μm or less in thickness. Particularly preferably, the reinforcing resin layer 15 is 0.5 μm to 1 μm in thickness. This is because a necessary reinforcing strength may not be obtained if the reinforcing resin layer 15 is less than 0.5 μm in thickness, and the sensor sensitivity may be degraded and the response speed may be lowered if the reinforcing resin layer 15 is more than 1 μm in thickness. The method of forming the reinforcing resin layer 15 is the same as the method of forming the gas-sensitive film 11.

The second electrode layers 13, 13 were electrically conductive layers containing single-walled carbon nanotubes (SWCNT) as an electrically conductive material. In the present example, the second electrode layers 13, 13 were formed by a transfer method. The second electrode layers 13, 13 were configured to have a width of 2 mm and a thickness of about 100 nm to several micrometers. The second electrode layers 13, 13 were formed by a transfer method or an application method described in detail in JP 2015-7618 A mentioned above as a related-art document. Explanation of such a formation method is omitted herein. The method of forming a film by the transfer method or the application method is much easier than a method of forming a film by plasma processing or vacuum processing. The second electrode layers 13, 13 which were formed by the transfer method had rough surfaces. This indicates that the carbon nanotubes of the second electrode layers 13, 13 were entangled with each other so that the second electrode layers 13, 13 had surfaces with projections and depressions. The second electrode layers 13, 13 which were formed by the transfer method were integrated with the gas-sensitive film 11 with a certain degree of strength. However, if the first electrode layer 5 and the second electrode layer 13 are separated from each other when the bonding strength therebetween is lowered due to increased humidity in the use environment or a change over time, the contact area may be decreased to increase the electrical resistance, which may make the capacitive gas sensor unable to perform a measurement when the frequency of an applied AC signal is high. Therefore, in the present embodiment, the reinforcing resin layer 15 is provided.

In the present example, SWCNT was used as the electrically conductive material of the second electrode layers 13, 13. However, the electrically conductive material which constitutes the second electrode layers 13, 13 may be an appropriate combination of nano-sized carbon materials (nano-carbon materials) such as double-walled carbon nanotubes (DWCNT) and graphene, besides SWCNT and multi-walled carbon nanotubes (MWCNT). In the present invention, the term "nano-carbon material" means single use of or a combination of nano-carbon materials such as SWCNT, MWCNT, DWCNT, and graphene.

(Test)

Figure 3:
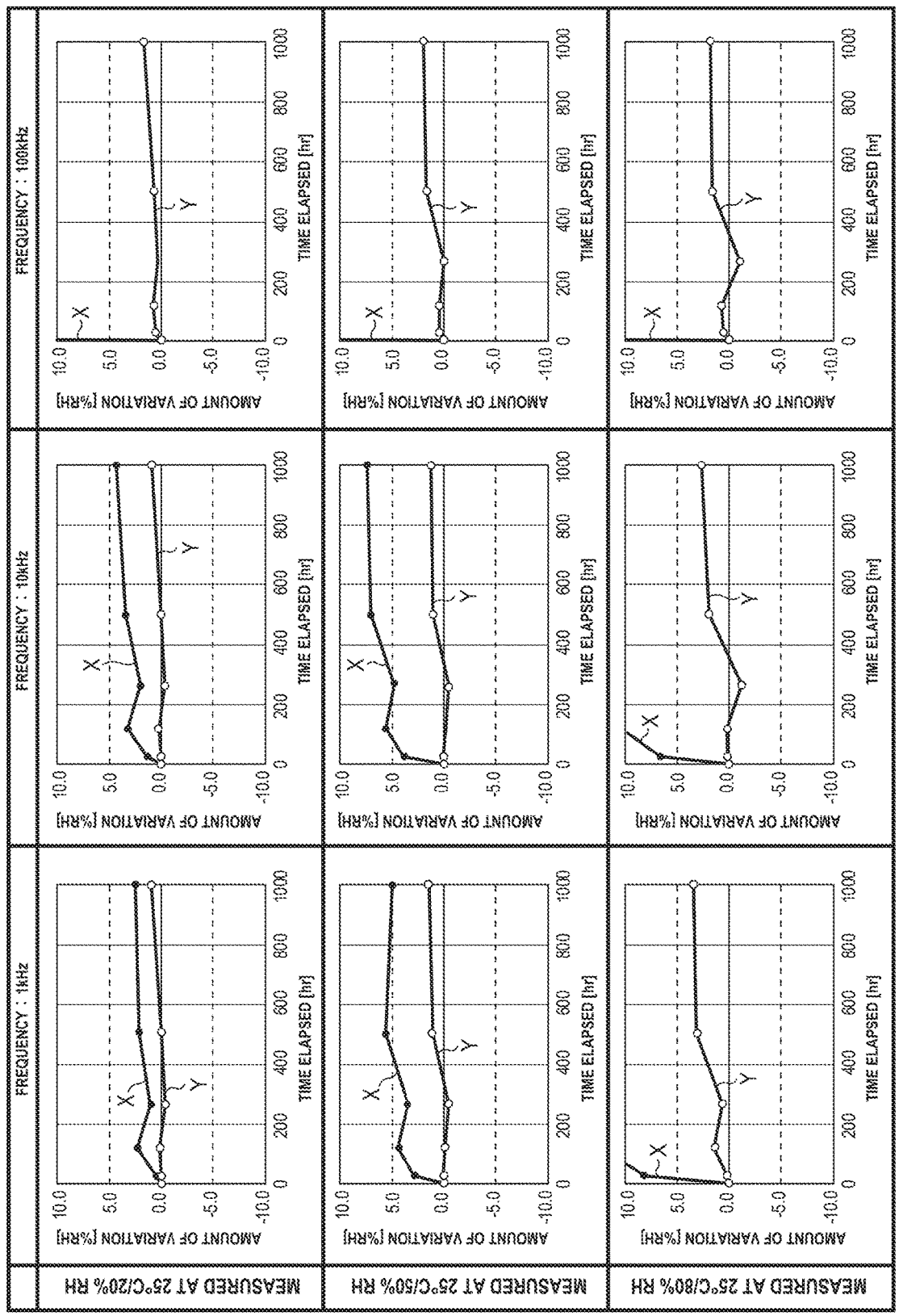
FIG. 3 illustrates the results of measuring variations in capacitance while varying the humidity and the frequency of an AC signal for a capacitive gas sensor provided with a reinforcing resin layer and a capacitive gas sensor not provided with a reinforcing resin layer.

In order to verify the meritorious effect obtainable from the present invention, variations in capacitance were measured for the capacitive gas sensor according to the above example which was provided with the reinforcing resin layer 15 and a capacitive gas sensor which was not provided with the reinforcing resin layer 15 while varying the humidity and the frequency of an AC signal applied between the first electrode layer 5 and the second electrode layers 13, 13. FIG. 3 illustrates the measurement results.

Variations in capacitance were made by measuring the capacitance of the humidity sensor with respect to the relative humidity by the following method. That is, a chamber (internal capacity: about 110 cm$^3$) with an openable door was installed in a constant-temperature constant-humidity bath, and the humidity sensor as the measurement target was set in the chamber. Dried air was introduced into the chamber via a flow path that communicated with the outside of the constant-temperature bath with the openable door of the chamber closed, and air was discharged to the outside to bring the chamber into the dry state (humidity: 0 to 2% RH).

Next, the outside of the chamber, that is, the inside of the constant-temperature constant-humidity bath, was set to a humidity at which a measurement was to be performed. The openable door of the chamber was opened (for humidification) when a predetermined humidity was achieved, and variations in capacitance of the sample were measured using a capacitance meter (LCR meter) connected to the temperature sensor of the sample. The openable door was closed a predetermined time (100 seconds) after the openable door was opened, dried air was introduced into the chamber (for dehumidification), and variations in capacitance of the sample in the dry state were measured.

The measurement was performed three times at each of predetermined humidities (measurement humidities) of 20%, 50%, and 80% by varying the frequency (1 kHz, 10 kHz, and 100 kHz) of an applied AC signal. The value of the capacitance meter when the inside of the chamber was in the dry state was defined as 0% RH. All the measurements were performed at room temperature (25° C.)

Variations in capacitance were compared between a case where the reinforcing resin layer 15 was provided (line Y) and a ease where the reinforcing resin layer 15 was not provided (line X). As seen in FIG. 3, the variations in capacitance were in the allowable range under all conditions when the reinforcing resin layer 15 was provided (line Y), but the variations in capacitance we e immeasurably large whe n the humidity was significantly high or the frequency of an applied AC signal was significantly hig h when, the reinforcing resin layer 15 vas not provided. This means that the second electrode layer 13 and the gas-sensitive film 11 were separated from each other when the reinforcing resin layer 15 was not provided (line X). It is seen from FIG. 3 that the second electrode layer 13 and the gas-sensitive film 11 not separated from each other under any conditions when the reinforcing resin layer 15 was provided (line Y).

Second Embodiment

Figure 4:
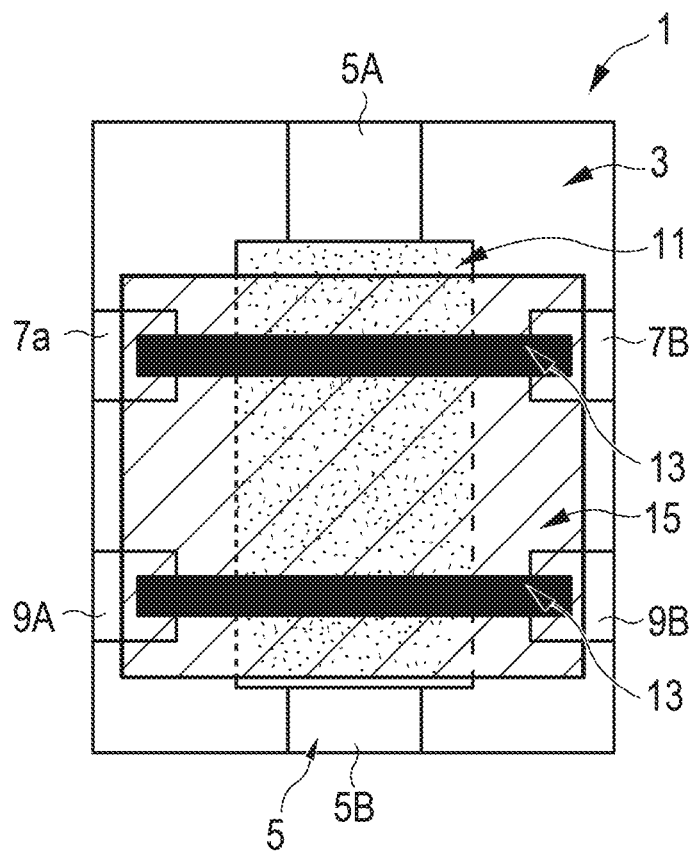
FIG. 4 is a plan view illustrating an example capacitive gas sensor fabricated as a humidity sensor according to a second embodiment of the present invention.

Next, a second embodiment of the present invention will be described. FIG. 4 is a plan view of the second embodiment. In the second embodiment, unlike the first embodiment in FIG. 1, the second electrode layers 13, 13 are formed on the substrate 3 such that the pairs of electrode portions 7A and 7B and 9A and 9B are overlaid respectively on both ends of the second electrode layers 13, 13, and the reinforcing resin layer 15 is shaped and sized to cover the both ends of the second electrode layers 13, 13 and a part of the pairs of electrode portions 7A and 7B and 9A and 9B. If the reinforcing resin layer 15 is formed in this manner, separation of the second electrode layers 13, 13 from the electrode portions 7A and 7B and 9A and 9B can also be effectively prevented.

In the first and second embodiments, two second electrode layers 13 are provided for one first electrode layer 5. As a matter of course, however, the present invention also covers a case where one second electrode layer 13 is provided for one first electrode layer 5.

Third Embodiment

Figure 5:
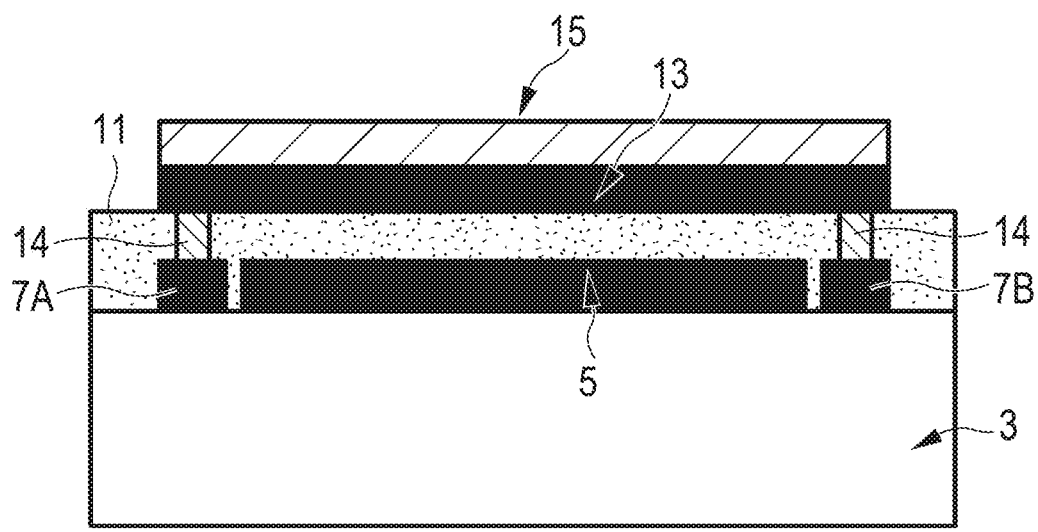
FIG. 5 is a sectional view illustrating an example capacitive gas sensor fabricated as a humidity sensor according to a third embodiment of the present invention.

Next, a third embodiment of the present invention will be described. In the first and second embodiments, most or entirety of the second electrode layer 13 is covered by the reinforcing resin layer 15. In the third embodiment, however, only the surface of the second electrode layer 13 is covered by the reinforcing resin layer 15. FIG. 5 is a sectional view of the third embodiment. Specifically, the gas-sensitive film 11 is formed on the entire substrate 3 to expose the pair of electrode portions 7A and 7B which are connected to both ends of the second electrode layer and electrode portions (not illustrated) of the first electrode layer 5. Then, both ends of the second electrode layer 13 and the pair of electrode portions 7A and 7B are connected to each other by electrically conductive through-hole portions 14. In the present embodiment, the electrically conductive through-hole portions 14 are formed from the same electrically conductive material as the electrically conductive material forming the second electrode layer 13. As a matter of course, the electrically conductive through-hole portions 14 may be formed from an electrically conductive material that is different from the electrically conductive material forming the second electrode layer 13. In the present embodiment, unlike the first and second embodiments, the reinforcing resin layer 15 having air permeability is provided only on the second electrode layer 13. Also with such a structure, a resin that constitutes the reinforcing resin layer gets into voids inside the second electrode layer which is made of a nano-carbon material entangled to be three-dimensionally reticulated, and a part of the resin contacts the gas-sensitive film. Consequently, the reinforcing resin layer 15 plays a function of preventing separation of the second electrode layer 13 from the gas-sensitive film 11. Thus, also with such a structure, a resin that constitutes the reinforcing resin layer 15 is partially bonded to a part of the gas-sensitive film 11, thereby preventing separation of the second electrode layer 13 from the gas-sensitive film 11.

(Modification)

In each of the embodiments described above, the gas-sensitive film 11 is formed using fluorinated polyimide. As a matter of course, however, the gas-sensitive film 11 may be formed using any other material that has air permeability after being cured such as a polyimide-based organic compound, cellulose, a cellulose-based organic compound, and a polyvinyl alcohol (PVA). As a matter of course, the gas-sensitive film and the reinforcing resin layer may be formed using a polyimide-based photosensitive resin.

(Detection Target of Capacitive Gas Sensor)

In each of the embodiments described above, the capacitive gas sensor according to the present invention is utilized as a humidity sensor. The capacitive gas sensor according to the present invention is not limited to the use as a humidity sensor. The capacitive gas sensor according to the present invention may also be utilized as a gas sensor configured to detect the concentration of an organic compound such as alcohol and aldehyde.

In recent years, many electronic devices have been provided as products having various circuit components and sensors to provide a combination of functions. If a humidity sensor or a common gas sensor can be incorporated in a circuit substrate, such a sensor can contribute to a size reduction and facilitate mass production etc.

INDUSTRIAL APPLICABILITY

According to the present invention, a reinforcing resin layer having air permeability is disposed at least on the second electrode layer. As a result, the reinforcing resin layer gets into voids inside the second electrode layer which is made of a nano-carbon material entangled to be three-dimensionally reticulated, and a part of the reinforcing resin layer contacts the gas-sensitive film. Consequently, the reinforcing resin layer plays a function of preventing separation of the second electrode layer from the gas-sensitive film.

DESCRIPTION OF REFERENCE NUMERALS 1 capacitive gas sensor
3 substrate
5 first electrode layer
11 gas-sensitive film
13 second electrode layer
15 reinforcing resin layer

The invention claimed is:
1. A capacitive gas sensor comprising:
   a substrate;
   a first electrode layer formed on the substrate;
   a gas-sensitive film formed on the first electrode layer and having air permeability, the gas-sensitive film varying in capacitance according to a change in humidity and having hydrophilic properties;
   a second electrode layer formed on the gas-sensitive film to be opposed to the first electrode layer and made of a nano-carbon material entangled to be three-dimensionally reticulated; and
   a reinforcing resin layer having air-permeability, made of a same material as the gas-sensitive film, varying in capacitance according to a change in humidity and having hydrophilic properties, and disposed at least on the second electrode layer,
   wherein the material of the reinforcing resin layer gets into voids in the nano-carbon material of the second electrode layer that is entangled to be three-dimensionally reticulated, and a part of the reinforcing resin layer directly contacts the gas-sensitive film; and
   wherein both the gas-sensitive film and the reinforcing resin layer are made of fluorinated polyimide.
2. The capacitive gas sensor according to claim 1, wherein the reinforcing resin layer is present only on the second electrode layer.

3. The capacitive gas sensor according to claim 1, wherein:
the second electrode layer is sized such that a part of the gas-sensitive film extends out around the second electrode layer; and
the reinforcing resin layer having air permeability covers the second electrode layer and at least a part of the gas-sensitive film that extends out of the second electrode layer.

4. The capacitive gas sensor according to claim 1, wherein:
the reinforcing resin layer is 2 μm or less in thickness.

5. The capacitive gas sensor according to claim 1, wherein the nano-carbon material is composed of one or more sorts selected from SWCNT, MWCNT, DWCNT, and graphene.

6. The capacitive gas sensor according to claim 1, wherein:
at least one first electrode portion is formed on the substrate to connect to the first electrode layer and at least one second electrode portion is formed on the substrate to connect to the second electrode layer;
the gas-sensitive film is formed on the substrate to cover the first electrode layer and to expose the at least one first electrode portion and the at least one second electrode portion; and
the second electrode layer, the at least one second electrode portion, and the gas-sensitive film are electrically connected to each other via an electrically conductive through-hole portion.

7. The capacitive gas sensor according to claim 1, wherein:
a pair of electrode portions are formed on the substrate such that the pair of electrode portions are overlaid respectively on both ends of the second electrode layer for electrical connection; and
the reinforcing resin layer is shaped and sized to cover the both ends of the second electrode layer and a part of the pair of electrode portions.

8. The capacitive gas sensor according to claim 2, wherein the nano-carbon material is composed of one or more sorts selected from SWCNT, MWCNT, DWCNT, and graphene.

9. A capacitive gas sensor comprising:
a substrate;
a first electrode layer formed on the substrate;
a gas-sensitive film formed on the first electrode layer and having air permeability, the gas-sensitive film varying in capacitance according to a change in humidity and having hydrophilic properties;
two second electrode layers formed on the gas-sensitive film to be opposed to the first electrode layer and made of a nano-carbon material entangled to be three-dimensionally reticulated; and
a reinforcing resin layer having air permeability, made of a same material as the gas-sensitive film, and varying in capacitance according to a change in humidity and having hydrophilic properties;
wherein:
the two second electrode layers are formed at an interval on the gas-sensitive film to cross the first electrode layer;
the two second electrode layers are sized in width such that a part of the gas-sensitive film extends out around the two second electrode layers;
the reinforcing resin layer covers the two second electrode layers and at least a part of the gas-sensitive film that extends out of the two second electrode layers;
the material of the reinforcing resin layer gets into voids in the nano-carbon material of the second electrode layer that is entangled to be three-dimensionally reticulated, and a part of the reinforcing resin layer directly contacts the gas-sensitive film; and
both the gas-sensitive film and the reinforcing resin layer are made of fluorinated polyimide.

* * * * *